United States Patent

[11] 3,549,966

| [72] | Inventor | David H. Wilson |
| | | Houghton, near Preston, England |
| [21] | Appl. No. | 839,869 |
| [22] | Filed | July 8, 1969 |
| [45] | Patented | Dec. 22, 1970 |
| [73] | Assignee | Tracked Hovercraft Limited |
| [32] | Priority | July 18, 1968 |
| [33] | | Great Britain |
| [31] | | 34,336/68 |

[54] LINEAR MOTOR SPEED CONTROL SYSTEM
7 Claims, 8 Drawing Figs.

[52] U.S. Cl. .................................................. 318/135,
318/227, 318/373; 310/13; 104/148
[51] Int. Cl. .................................................. H02k 41/02
[50] Field of Search .................................................. 318/121,
135, 227—231, 373; 310/12—14; 104/148LM

[56] References Cited
UNITED STATES PATENTS

| 3,154,695 | 10/1964 | MacGregor et al. | 318/227X |
| 3,179,867 | 4/1965 | Delgado | 310/13X |
| 3,320,506 | 5/1967 | Humphrey | 318/230X |
| 3,348,110 | 10/1967 | Koppelman | 318/230X |
| 3,361,081 | 1/1968 | Bliss | 104/148 |
| 3,368,133 | 2/1968 | Zenner | 318/227X |
| 3,441,823 | 4/1969 | Schlabach | 318/227X |
| 3,462,883 | 8/1969 | Reeks et al. | 318/135X |

*Primary Examiner*—D. F. Duggan
*Attorney*—Cameron, Kerkam & Sutton

ABSTRACT: A motor speed control system for a three-phase linear motor, and in particular for a hovercraft vehicle propelled by a three-phase linear motor, by which demanded speed is compared with actual speed error signal. A modified demanded speed signal is derived, characterized by predetemined rate of change, and compared with the actual speed to provide a further error signal. This further error signal controls the firing circuit for a thyristor three-phase alternating current regulator which controls the linear motor.

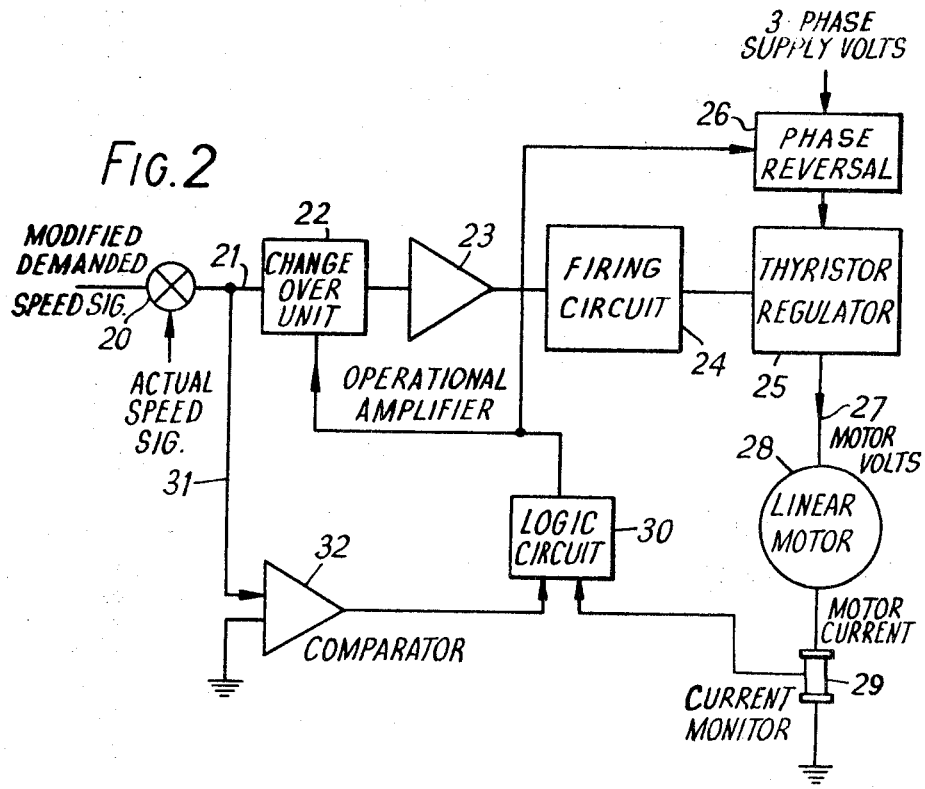
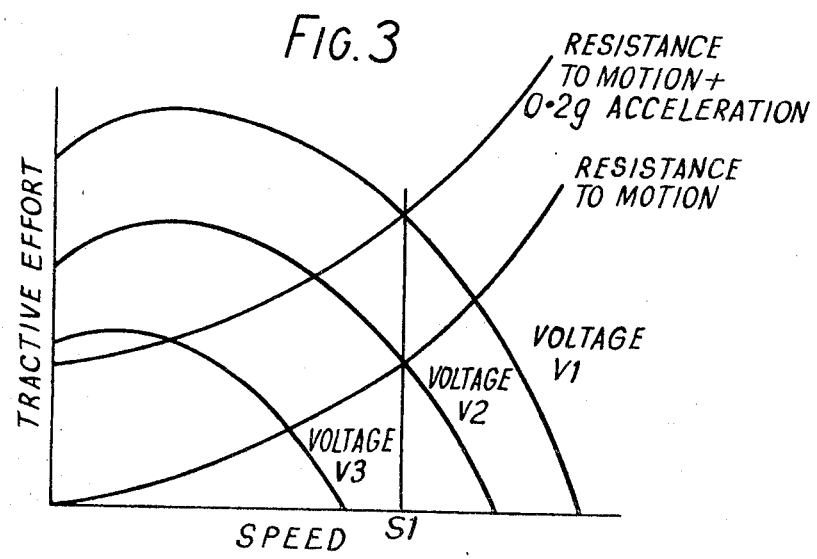

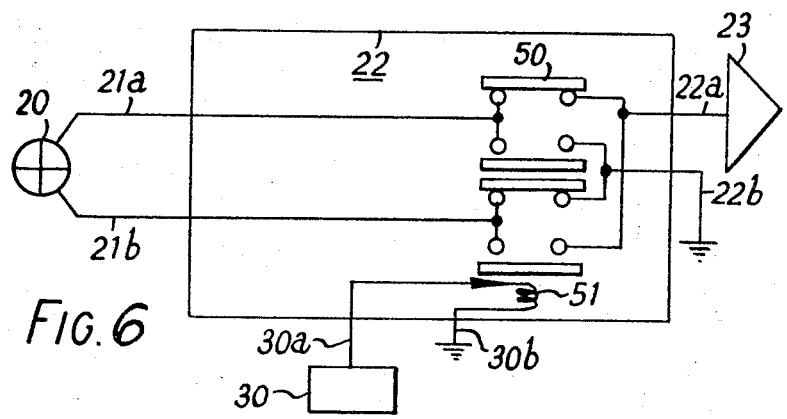
FIG. 6
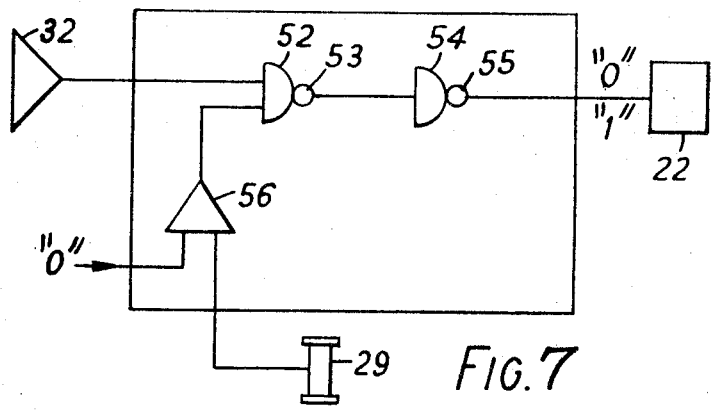
FIG. 7
| INPUT FROM 32 | CURRENT IN 29 | OUTPUT TO 22 |
|---|---|---|
| 0 | + | 0 |
| 0 | − | 0 |
| 1 | + | 0 |
| 1 | − | 1 |
FIG. 8

LINEAR MOTOR SPEED CONTROL SYSTEM

This invention relates to a speed control system for a vehicle propelled by a linear induction motor. Such motor comprise a generally flat stator or a pair of stators carrying windings in the form of a row of coils which are fed with alternating current to produce a magnetic field which travels along the stator, and a rotor comprising an elongated strip or rail which is usually a fixed member.

The fixed rail or rotor is preferably made of a high resistance alloy such as stainless steel or manganese/steel alloy.

The use of a high resistance reactor rail ensures that high tractive effort is available at low vehicle speeds. This tractive effort varies with the voltage applied to the motor.

An object of the invention is to provide an effective speed control system for a vehicle propelled by a linear induction motor and employing a high resistance rotor or reactor rail.

According to the invention the control system comprises:
means for comparing the demanded speed of the vehicle with the actual speed of the vehicle and producing a speed error signal;
means for converting the error signal to a "modified demanded speed" signal, having a value which is constrained to change at a set rate; a closed loop speed control in which the actual speed is compared with the "modified demanded speed" producing a further error signal;
means for amplifying the further error signal and converting it to a firing angle signal;
a thyristor regulator supplied with three-phase AC the output voltage of the regulator being supplied to the linear motor; and
means for supplying the firing angle signal to the thyristor regulator so as to vary the output voltage of the thyristor regulator and hence the vehicle speed in such a manner as to reduce the speed error.

It is also an object of this invention to provide a means for reversing the thrust of the motor.

According to a feature of the invention the means for reversing the thrust of the motor when the speed error signal changes polarity includes means to reverse the output of the amplifier, the firing circuit being so designed that the firing pulses are then removed and the current through the linear motor decays rapidly, means to supply a logic circuit with an input signal when the current in all three phases has decayed to zero, the logic circuit being arranged, on receipt of said input signal and of a signal indicating that the error polarity has been changed, to energize contactors to reverse two of the three phases of the input to the thyristor regulator and at the same time to energize a changeover unit which changes the polarity of the signal input to the amplifier, thus causing the motor to produce reverse thrust.

In order that the invention may be readily carried into practice, one embodiment of the invention will now be described in detail, by way of example, with reference to the accompanying drawings, in which:

FIG. 2 is a schematic block diagram of a speed control system for controlling a linear induction motor for propelling the hovercraft shown in FIG. 1;

FIG. 3 illustrates the linear motor and hovercraft characteristics;

FIG. 6 is a circuit diagram of the changeover unit 22 of FIG. 2;

FIG. 7 is a schematic diagram of the logic unit 30 of FIG. 2; and

FIG. 8 is a logic table defining the operation of the logic unit of FIG. 7.

Figure 1:
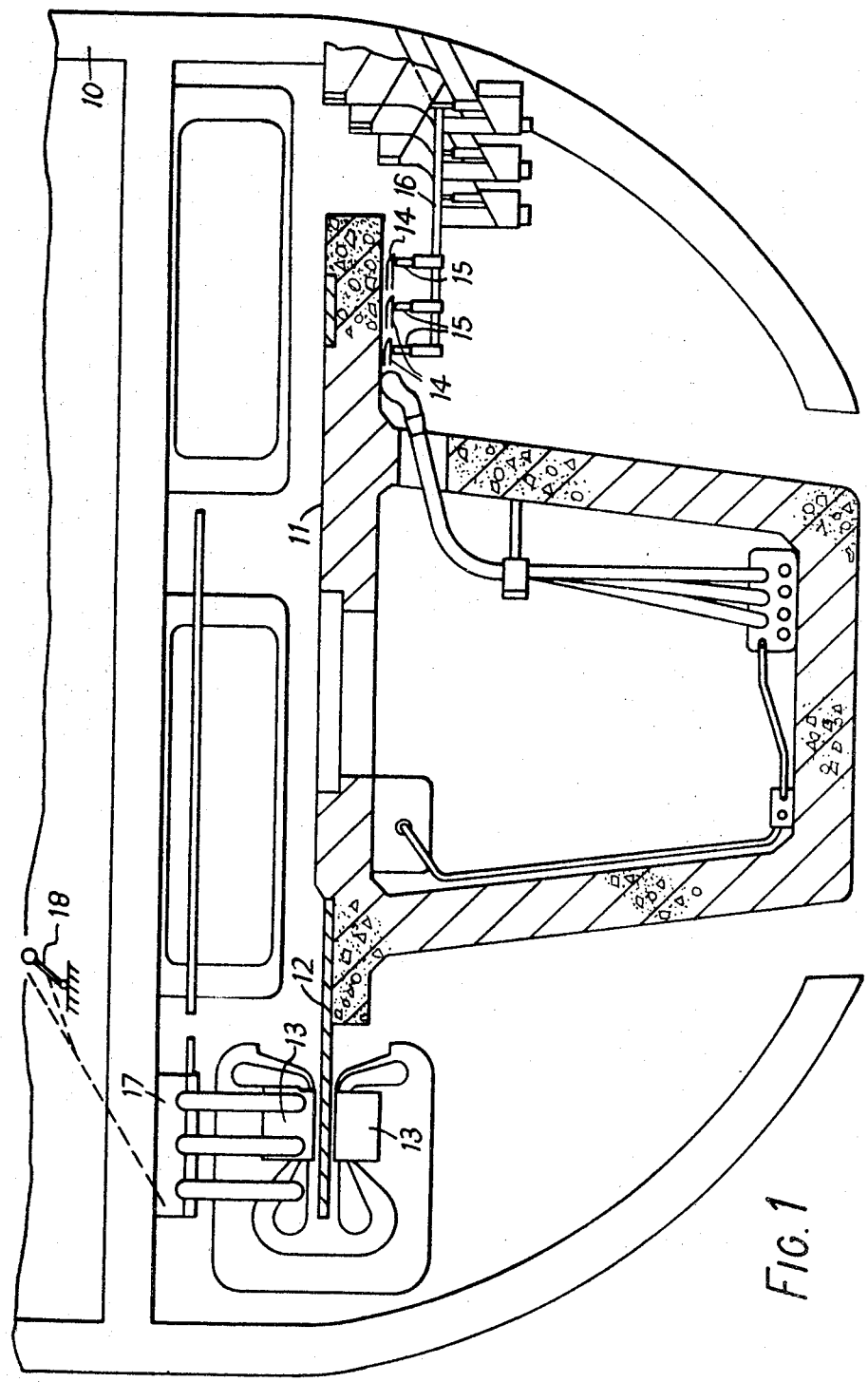
FIG. 1 is a transverse section of a hovercraft constrained to move along and be guided by a prepared track.

In FIG. 1 is shown a cross section of a linear motor-propelled hovercraft 10 adapted to ride along a track 11 being supported and guided along the track by air cushions (not shown). Such a vehicle is described and illustrated more fully in British Pat. specifications No. 995,127 and No. 1,002,588. At one side of the T-shaped track 11 is mounted a manganese/steel rotor or linear motor rail 12 which is straddled by a linear induction motor 13. A three-phase AC supply for the motor is provided by means of three conductor rails 14 fixed to the underside of the track 11. Current is picked up by three brushes 15 supported by pickup arms 16 from the vehicle 10. The current is supplied to the motor via a control box 17 which contains the whole contents of FIG. 5. The driver's speed controller is shown diagrammatically at 18 but would, of course, be located in the driver's cab.

A "modified demanded speed" signal is supplied to a device 20 (FIG. 2) together with an actual speed signal so as to produce on line 21 an error signal which is passed through a changeover unit 22 to an operational amplifier 23. The output of amplifier 23 is supplied to the firing circuit 24 of a thyristor regulator 25. The three-phase AC at a fixed frequency and voltage is supplied via phase reversal circuit 26 to the thyristor regulator 25, the output of which is the motor supply voltage and is supplied via line 27 to the linear motor stator 28. The motor current flows via current monitor 29 to earth. The signal produced by the current monitor is supplied to a logic circuit 30 designed to operate the changeover unit 22 and the phase reversal unit 26. The speed error signal is supplied along line 31 to a comparator 32 which determines whether the error signal is positive or negative, and indicates this to the logic circuit 30.

The system entails supplying the linear motor propulsion system with a fixed frequency, three-phase, variable voltage supply, and involves using an 11—14percent manganese steel reactor rail. The voltage supplied to the motor is varied by phase angle control of the three-phase 3.3kv. nominal line voltage by means of the thyristor regulator 25 (Fig. 2).

The primary function of the control system is to control the speed of the hovercraft. Its input signal is a demanded speed which, as shown, is derived from a driver's controller, but could be derived from an automatic controller which would either be programmed for a particular run or would compute a demanded speed dependent on the distance travelled down the track.

The control system is designed so that the hovercraft will always accelerate and brake with an acceleration which is limited to a value commensurate with passenger comfort.

FIG. 3 shows the tractive effort against speed characteristic of the hovercraft for constant speed and for 0.2g. acceleration. The linear motor torque against speed characteristics for three values of supply volts are drawn on the same axes. It is clear that to accelerate at 0.2g. at speed $S_1$ then supply volts $V_1$ are required, and to travel at constant speed $S_1$, supply volts $V_2$ are required. The control system will automatically ensure that the appropriate volts are applied for the demanded speed and acceleration.

It is clear from FIG. 3 that constant acceleration does not correspond to a constant tractive effort so that this cannot be obtained by limiting the motor tractive effort or any such simple device. The control system, therefore, includes a device which limits the rate of change of the speed input signal in such a way as to ensure that vehicle acceleration or deceleration will always take place at the specified level. Thus if a step change of speed were applied via the driver's controls, the motor would be controlled to accelerate or brake the vehicle smoothly to the required speed.

The detailed operation of the speed control loop is as follows. The modified demanded speed is compared with the actual speed at 20 and the speed error signal is then amplified by the operational amplifier 23; the resulting output voltage is converted to a firing angle by the firing circuit 24 and the resulting gating pulses fed to the thyristor regulator 25, which changes the voltage applied to the linear motor 28 in such a way to reduce the error. If the error signal changes polarity- —due to either a slower speed being demanded or due to the hovercraft being presented with an external driving force, either wind or gravity—the following sequence is observed:

First, the output of the amplifier 23 is reversed and the firing circuit 24 is designed so that the firing pulses are removed. The current through the linear motor 28 will then rapidly decay. When the current in all three phases has decayed to zero the logic circuit 30 receives an input signal. If it has also received a signal from the comparator 32 indicating that the error polarity has changed, then it energizes contactors to reverse two of the phases input to the thyristor regulator 25, and at the same time energizes a changeover unit 22 which changes the polarity of the signal input to the amplifier 23. The motor 28 is hence caused to produce reverse thrust.

This circuitry ensures that the phase reversal contactors were not operated until the current had decayed to zero. Moreover, the control system is "over-damped" so that there would be no overshoots resulting from a step change in speed, so that the contactors will operate only when reverse motor torque was required.

If desired, it is possible to override this control system and operate the firing circuit directly from a driver's signal, by supplying the demand signal from a driver's controller directly to the firing circuit 24.

Figure 4:
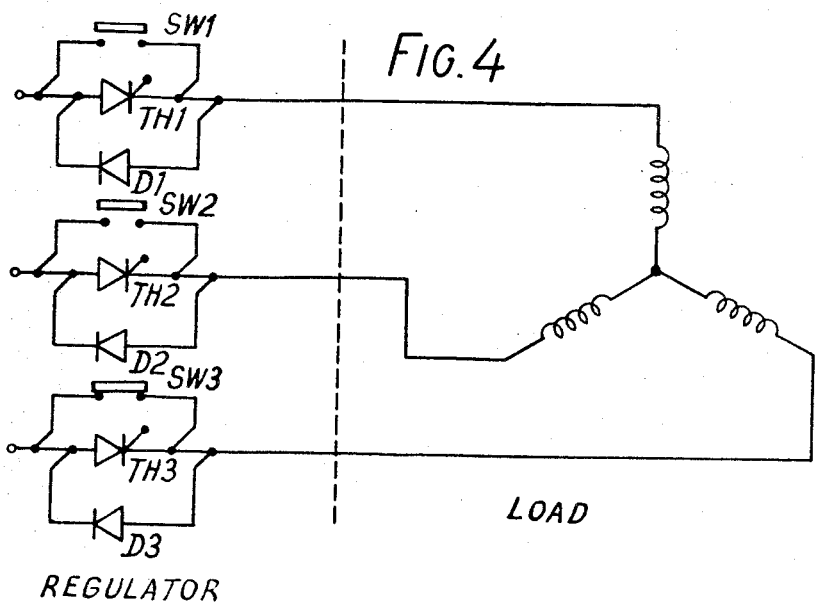
FIG. 4 shows some circuit details of a thyristor regulator which forms part of FIG. 2.

The thyristor regulator 25 is shown in detail in FIG. 4, the regulator being on the left-hand side of the figure and the load on the right-hand side of the figure.

The regulator contains thyristors, labeled TH1, TH2, TH3, and diodes, labeled D1, D2, D3, in three modules. One module contains thyristor TH1 and diode D1 and is shunted by a contactor SW1; a second module shunted by a contactor SW2 contains thyristor TH2 and diode D2; and a third module shunted by a contactor SW3 contains thyristor TH3 and diode D3.

The applied voltage, and hence the load current may be varied smoothly between zero and full output by varying the firing angle of the thyristors. The control characteristic will depend on the power factor of the load, since clearly for a 90° lagging load, delaying the firing point of the thyristors by 90° will result in full output, whereas for a completely resistive load this will result in 50percent output. Since the power factor of the linear motor varies with the slip, the control characteristic will vary correspondingly. However, since the regulator is contained within a closed loop speed control, there will be a negligible effect on the closed loop characteristic of the system as a whole.

Each thyristor switching module is shunted by fast acting contactors SW1—3 (FIG. 4). Their function is firstly to protect the thyristors against any short circuiting of the load, and secondly to allow emergency braking if a failure of the regulator occurs.

The overall control system incorporating the speed control unit of FIG. 2 is shown in FIG. 6. The speed control unit described in relation to FIG. 2 and shown as block 35 in FIG. 6 is fed with a "modified demanded speed" signal at 36. The actual demanded speed from a driven speed controller 18 is applied at 38 to a difference device 38a, the output of which goes to an operational amplifier 39 and then through an output limiter 40 to an integrator 41 producing a modified demand speed signal at 36. This signal is also fed back via loop 42 to the device 38a. Assume that the demanded speed signal to the overall system undergoes a step change. An error signal causes the amplifier 39 (which has high gain) to saturate, and this saturated output voltage causes the integrator 41 to integrate at a set rate. The amplifier 39 remains saturated until the "modified demanded speed" has reached the "demanded" value, when the integrator 41 stops integrating and the hovercraft will travel at a constant speed.

The circuit arrangements described with reference to the schematic diagrams of FIGS. 2 and 5 will now be explained in greater detail. Referring, first, to FIG. 2, the phase reversal unit 26 comprises conventional switchgear such as is known for the reversal of rotation of a three-phase induction motor.

The thyristor regulator 25 is as has been described with reference to FIG. 4. The circuit arrangement there shown is substantially as described in the "Institution of Electrical Engineers Conference Publication No. 17, Part 1-Power Applications of Controllable Semiconductor Devices-10th, 11th November 1965".

The linear motor 28 may be a linear motor such as is described in British Pat. No. 995,127 or in British Pat. No. 1,002,588.

The current monitor 29 conveniently comprises three current transformers, one connected in series with each phasewinding of the linear motor 28.

The device 20 may, in its simplest form represent a point in the circuit where the two input signals "modified demanded speed signal" and "actual speed signal" appear across a common circuit element.

The changeover unit 22 may have the form shown in FIG. 6. In this figure, the signal from device 20 is shown as appearing between two input lines 21a, and 21b, which together represent line 21 of FIG. 2. A two-pole changeover switch, shown generally at 50 is moved to one or the other of its switching conditions, by electromagnet coil 51, or the functional equivalent means, accordingly as a signal "0" or a signal "1" is supplied from the logic unit 30 between lines 30a and 30b. When signal "0" appears on lines 30a, 30b, lines 21a and 21b are connected to lines 22a and 22b, respectively. When signal "1" appears on lines 30a, 30b the said connections are reversed.

The operational amplifier 23 is a conventional unit. The firing circuit 24 is also a conventional unit and may be such as is described in the "Silicon Controlled Rectifier Handbook-International General Electric Company-Gullwitzer et al."

The comparator 32 is a conventional operational amplifier for comparing the magnitudes of two inputs. It has two output signal states defined as "0" and "1" and takes up one output state or the other as the error signal on line 21 is greater than zero or less than zero, respectively.

The logic circuit 30 is shown in detail in FIG. 7 and comprises, in series arrangement, an AND gate 52, an inverter 53, and AND 54 and an inverter 55. One input to AND gate 52 is provided by comparator 32 and the other input is provided by a comparator 56. Comparator 56 compares the analogue input from current monitor 29 with a reference b"0" and supplies a "0" or "1" output signal as the input signal from monitor 29 is positive or negative, respectively. The logic unit supplies a "0" or "1" output signal to changeover unit 22 in accordance with the logic table of FIG. 8.

Figure 5:
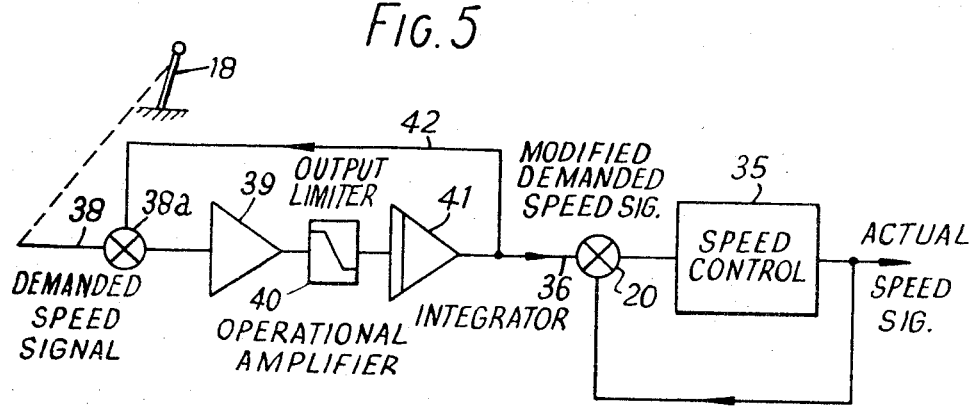
FIG. 5 shows an overall control system for a linear motor propelled hovercraft, the block marked Speed Control in FIG. 5 representing the whole of the schematic diagram shown in FIG. 2.

Referring now to FIG. 5, the device 38ais, in its simplest form, a circuit point at which the "demanded speed signal" and feedback signal on line 42 appear across a common circuit element.

Operational amplifier 39 is a conventional unit. The output limiter 40 controls the saturation level of operational amplifier 40, as by use of a Zener diode in the feedback line thereof.

The integrator 41 comprises a conventional operational amplifier provided with capacitive feedback.

It may be noted that the system described herein will prevent spurious operation of the phase reverser contactors. By way of illustration, consider the hovercraft travelling at maximum speed and then required to brake. It may be that initially the windage would provide full braking. In this case the error signal would not reverse, and the phase reversal contactors would not operate.

The system described above would provide speed control at any speed even if the external forces on the hovercraft were in such a direction to drive it—e.g. travelling down a gradient or at, say, 30m.p.h. tailwind. The method of controlling the linear motor by means of varying the voltage in conjunction with the manganese/steel reactor rail would involve operating the motor at high slip at low vehicle speeds; this results in a lower power factor than if frequency control were to be used, but since the motor would have a large air gap because of mechanical considerations, the effect would be overshadowed to some extent by the low power factor brought about in any event by the large gap. Voltage control has the advantages that the thyristors would be naturally commutated. Fast turn-off thyristors are not required, and the circuitry is very simple, resulting in reliability and minimum cost. The weight can also be kept to a minimum since no magnetic or wound component is employed.

I claim:

1. A speed control system for a vehicle propelled by a linear induction motor and including means for defining a demanded speed of the vehicle, comprising:
   means for comparing the demanded speed of the vehicle with the actual speed of the vehicle and producing a speed error signal;
   means for converting the error signal to a "modified demanded speed" signal, having a value which is constrained to change at a set rate; a closed loop speed control in which the actual speed is compared with the "modified demanded speed" producing a further error signal;
   means for amplifying said further error signal and converting it to a firing angle signal;
   a thyristor regulator supplied with three-phase AC the output voltage of the thyristor regulator being supplied to the linear motor; and
   means for supplying the firing angle signal to the thyristor regulator so as to vary the output voltage of the thyristor regulator and hence the vehicle speed in such a manner as to reduce the speed error.

2. A speed control system as claimed in claim 1, including means for reversing the thrust of the motor when the speed error signal changes polarity, comprising:
   means to reverse the output of the amplifier, the firing circuit being so designed that the firing pulses are then removed and the current through the linear motor decays rapidly;
   means to supply a logic circuit with an input signal when the current in all three phases has decayed to zero, the logic circuit being arranged, on receipt of said input signal and of a signal indicating that the error polarity has been changed, to energize contactors to reverse two of the three phases of the input to the thyristor regulator and at the same time to energize a changeover unit which changes the polarity of the signal input to the amplifier, thus causing the motor to produce reverse thrust.

3. A speed control system for a vehicle propelled by a three-phase linear induction motor, in which the linear induction motor is controlled by a three-phase thyristor regulator operated by a firing circuit controlled by an input signal thereto, said speed control system including a driver's controller for generating a demanded speed signal, a circuit arrangement including amplifier means, output limiter means, integrator means and feedback means, for generating a modified demanded speed signal, means receiving said modified demanded speed signal together with a signal representative of the actual speed of the vehicle and generating a further error signal, a comparator for determining the sign of said further error signal and providing an output signal accordingly, a current monitor for providing a signal representative of the current flowing in the three-phase windings of said three-phase linear induction motor, a logic circuit arrangement providing a first output signal or providing a second output signal solely when said further error signal and said signal from the current monitor are both negative, a changeover unit for supplying the said further error signal to said firing circuit by way of amplifier means, said changeover unit being adapted to reverse the sign of said further error signal when the logic circuit provides said second output signal, and phase reversal means for reversing the energizing sense of said linear motor when the logic circuit provides said second output signal.

4. A speed control system as claimed in claim 3, in which said circuit arrangement includes a first operational amplifier having variable saturation supplying an integrator comprising a second operational amplifier with capacitive feedback, negative feedback being supplied from the integrator output to the first operational amplifier input.

5. A speed control system as claimed in claim 4, in which the first operational amplifier includes a Zener diode in the feedback line thereof.

6. A speed control system as claimed in claim 3, in which said changeover unit includes double-pole changeover switch means set to alternative switching states by said first and second output signals of said logic circuit arrangement.

7. A speed control system as claimed in claim 3 in which said logic circuit arrangement comprises a first AND gate, a first inverter, a second AND gate and a second inverter serially arranged; a first input to said first AND gate from said comparator, and a second input form a second comparator adapted to respond to the sign of the signal from the current monitor.